(No Model.)

W. RATH.
COMBINED THRASHING MACHINE AND SEPARATOR.

No. 276,467. Patented Apr. 24, 1883.

WITNESSES:
C. Neveux
C. Sedgwick

INVENTOR:
W. Rath
BY Munn & Co.
ATTORNEYS.

UNITED STATES PATENT OFFICE.

WILLIAM RATH, OF SUTTON, NEBRASKA.

COMBINED THRASHING-MACHINE AND SEPARATOR.

SPECIFICATION forming part of Letters Patent No. 276,467, dated April 24, 1883.

Application filed June 29, 1882. (No model.)

*To all whom it may concern:*

Be it known that I, WILLIAM RATH, of Sutton, in the county of Clay and State of Nebraska, have invented a new and useful Improvement in Combined Thrashing-Machines and Separators, of which the following is a full, clear, and exact description.

Reference is to be had to the accompanying drawings, forming a part of this specification, in which the same letters of reference indicate the same or corresponding parts in all the figures.

Figure 1:
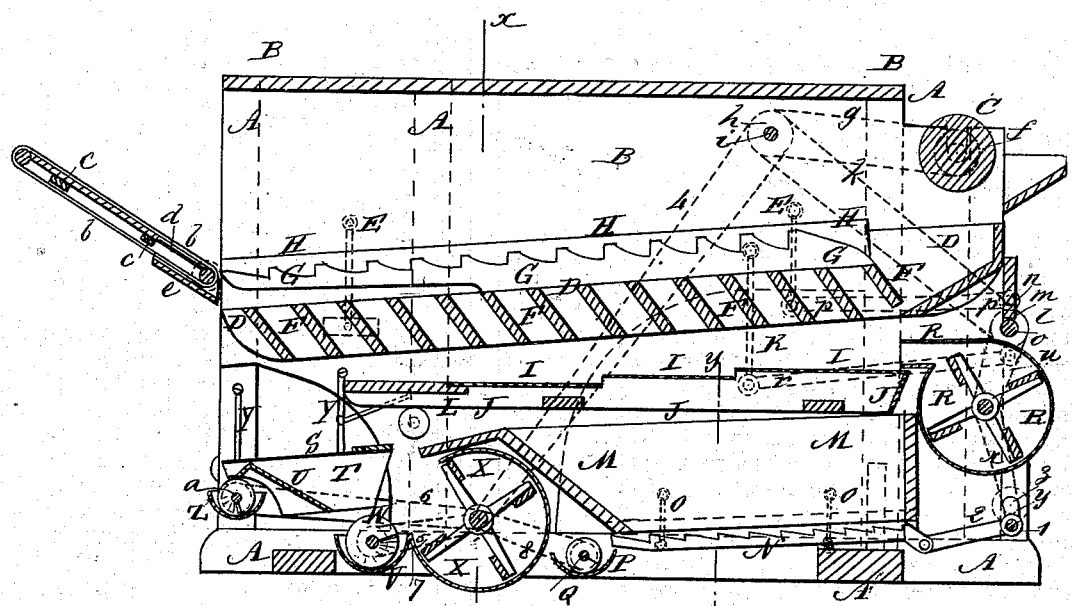
Figure 2:
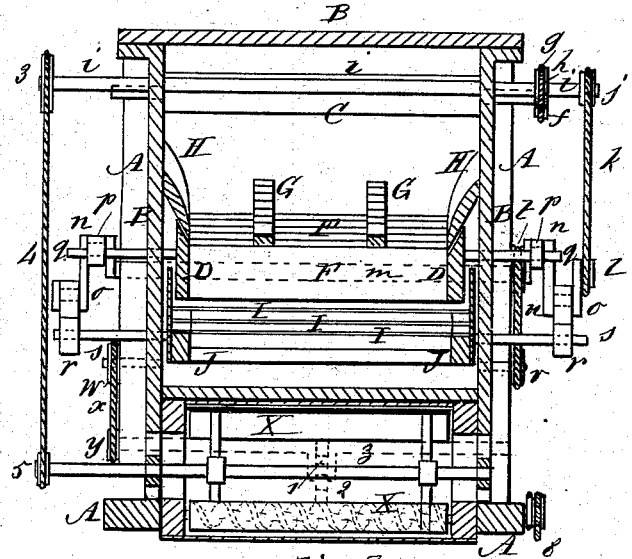
Figure 3:
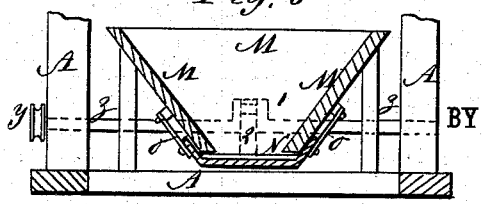

Figure 1 is a longitudinal sectional elevation of my improvement. Fig. 2 is a sectional end elevation of the same, taken through the line $xx$, Fig. 1. Fig. 3 is a sectional end elevation of a part of the same, taken through the line $yy$, Fig. 1.

The object of this invention is to facilitate the separation of the grain from the straw, and from chaff and foul seeds, as they come from the thrashing-cylinder.

A represents the frame, and B the casing, of the machine.

C is the thrashing-cylinder, from which the grain and straw pass to the separator.

D are the side bars of the separator, which are suspended from the casing B by hinged rods E, so that it can have a longitudinal vibration or shake.

To the side bars, D, are attached the ends of the cross bars or boards F, which are placed in an inclined position, and at a little distance from each other, as shown in Fig. 1.

To the upper edges of the cross-bars F are attached the lower edges of two or more longitudinal bars, G, the upper edges of which are notched or serrated to hold the mass of the straw off the cross-boards F of the separator. The lower edges of the parts of the serrated bars G, toward the tail end of the machine, are cut away, as shown in Fig. 1, so that the said parts will be free from the cross-bars F.

H are guard-boards attached to the casing B to overlap the upper edges of the side bars, D, and prevent straw from passing in between the said side boards and casing.

The machine is designed to be provided with a beater and pickers in the ordinary manner, but which are not shown in the drawings, as there is nothing new in their construction or operation. From the separator D F G the grain falls upon the screens I, which extend in a continuous line nearly the entire length of the machine, and which are attached to the frame J, so that they can be changed as the kind of grain being operated upon may require. The forward part of the frame J is suspended from the casing B by hinged rods K, and its forward part rests upon rollers L, pivoted to the said casing B, so that it can receive a longitudinal vibration or shake. The foul seeds and the broken and imperfect kernels of grain fall through the screens I into the long hopper M, the bottom N of which is separate, and is suspended by hinged rods O from the sides of the said hopper, so that it can receive a longitudinal vibration or shake to feed the foul seeds forward to the spout P, through which they are carried out of the machine by a conveyer-screw, Q. The inner surface of the vibrating bottom N is serrated to cause it to carry the foul seeds forward more readily.

In the lower part of the head of the machine is placed a fan-blower, R, the blast from which is directed against the grain as it falls from the separator D F G, and against the lower part of the said separator, and is guided by the inclined cross-boards F up through the said separator, so as to blow the chaff among the straw and to tend to raise the straw from the separator, and thus assist in shaking the grain out of the straw more thoroughly. The grain falls from the rearward end of the line of screens I upon the sieve S, attached to the shoe T, and falls through the said sieve to the inclined apron U, down which it slides into the spout V, and is carried out of the machine by the conveyer-screw W. Several sieves S can be attached to the shoe T, if desired, in the manner of an ordinary fan-mill. The grain, while passing into and through the shoe T, is exposed to a blast of air from a fan-blower, X, placed in the lower part of the machine. The shoe T is suspended from the casing B by hinged rods Y, and is agitated from the shaft of the fan-blower X in the manner of an ordinary fan-mill. The tailings from the sieve S fall into the spout Z, and are carried out of the machine by the conveyer-screw $a$. The tailings are designed to be carried back to the thrashing-cylinder C by an elevator in the ordinary manner, but which is not shown in the drawings. The straw from the separator D F G is received upon and carried to the stack by an endless carrier, $b$, the frame $c$ of which is connected with the machine, and supported in the ordinary manner.

In the upper side of the lower end of the carrier-frame $c$ is secured a sieve, $d$, through which any grain that may be blown or carried out of the machine with the straw falls upon a board, $e$, attached to the lower part of the said end of the carrier-frame $c$, and falls from the said board into the tailings-spout Z or upon the sieve S.

Motion is given to the thrashing-cylinder C from any convenient power by gearing or by a band and pulley, which are not shown in the drawings.

To a journal of the thrashing-cylinder C is attached a pulley, $f$, around which passes a band, $g$. The band $g$ also passes around a pulley, $h$, attached to the shaft $i$, which revolves in bearings in the upper part of the casing B, and which may have a beater connected with it to jar the grain out of the straw.

To the shaft $i$ is also attached a pulley, $j$, around which passes a band, $k$. The band $k$ also passes around a pulley, $l$, attached to the crank-shaft $m$, which revolves in bearings attached to the frame A, and upon each end of which is formed a double crank, $n$ $o$. To the cranks $n$ are pivoted the rear ends of two pitmen, $p$, the forward ends of which are pivoted to pins or rods $q$, attached to the side bars of the separator D F G, which pass out through slots in the casing B, so that the separator will be agitated by the revolution of the shaft $m$. To the cranks $o$ are pivoted the rear ends of the pitmen $r$, the forward ends of which are pivoted to pins or rods $s$, attached to the side bars of the screen-frame J, so that the frame J and screens I will be agitated by the revolution of the shaft $m$.

To the crank-shaft $m$ is also attached a pulley, $t$, around which passes a band, $u$. The band $u$ also passes around a pulley, $v$, attached to a journal of the shaft of the fan-blower R, so that the said fan-blower will be driven from the said shaft $m$. To the other journal of the shaft of the fan-blower R is attached a pulley, $w$, around which passes a band, $x$. The band $x$ also passes around a pulley, $y$, attached to the shaft $z$, which revolves in bearings attached to the lower part of the head of the frame A, and has a crank, 1, formed upon its middle part.

To the crank 1 is pivoted the end of a pitman, 2, the other end of which is pivoted to the bottom N of the hopper M, so that the said bottom will be vibrated by the revolution of the said shaft $z$. To the other end of the shaft $i$ is attached a pulley, 3, around which passes a band, 4. The band 4 also passes around a pulley, 5, attached to the journal of the shaft of the fan-blower X, so that the said fan-blower will be driven from the said shaft $i$.

To the journals of the fan-blower X are also attached pulleys to receive the bands 6 7 8, by which the conveyer-screws $a$ W Q are driven. By this construction all the operating parts of the machine will be driven from the thrashing-cylinder C.

Having thus described my invention, I claim as new and desire to secure by Letters Patent—

The combination, with the separator D F G, of the fan-blower R, the screens I S, and the blower X, whereby the grain is first subjected to a blast as it falls on screen I, then separated from the foul seeds and imperfect kernels by said screen, and then receives another blast from the blower X, as described.

WILLIAM RATH.

Witnesses:
LEONARD NEHF,
HENRY HANSEN.